No. 886,967. PATENTED MAY 5, 1908.
A. FORTNER.
VEHICLE SPRING.
APPLICATION FILED APR. 3, 1907.
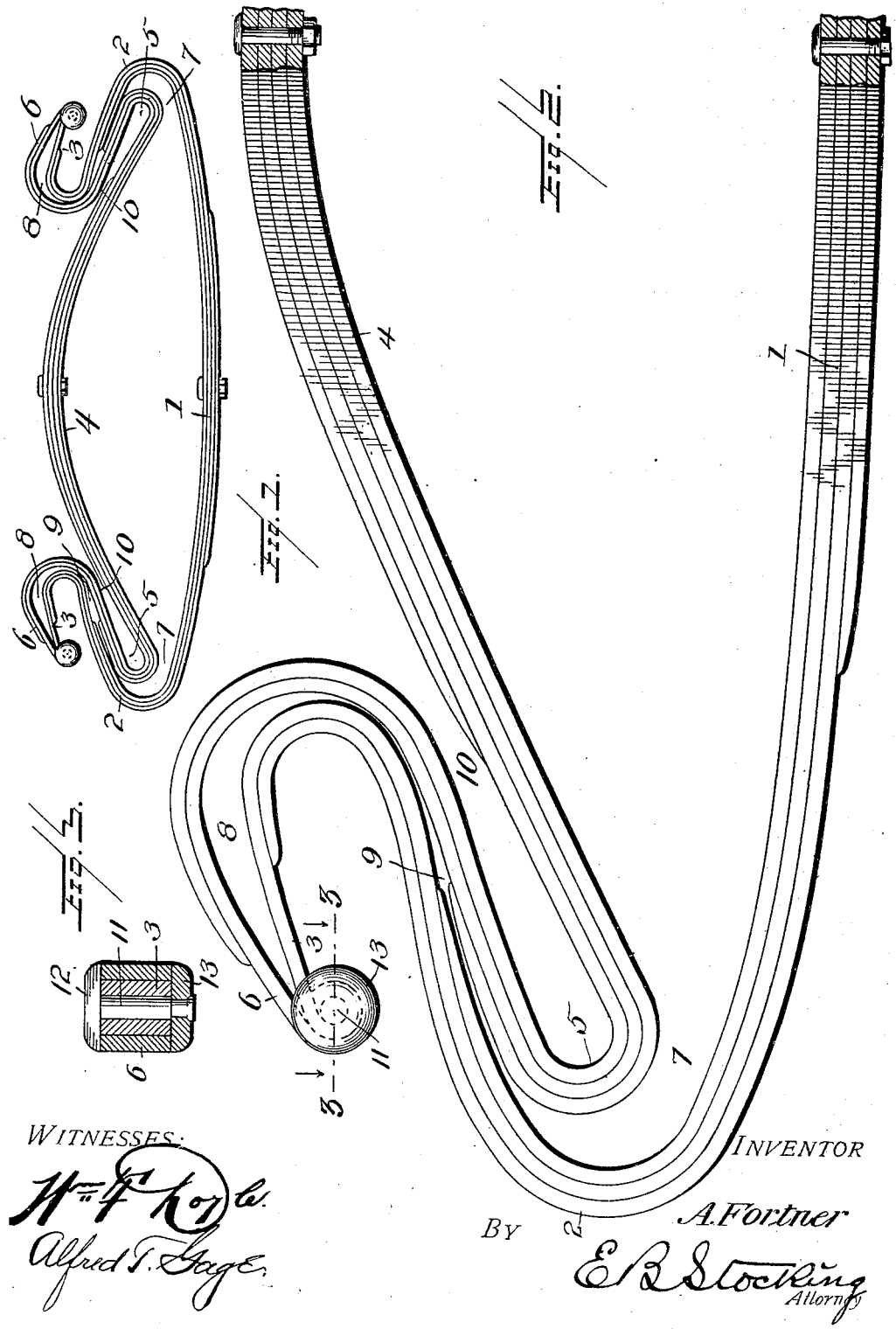
WITNESSES:
W F Koyle
Alfred T. Gage
INVENTOR
A. Fortner
BY E. B. Stocking
Attorney

UNITED STATES PATENT OFFICE.

ALFRED FORTNER, OF ST. ELMO, ILLINOIS.

VEHICLE-SPRING.

No. 886,967.     Specification of Letters Patent.     Patented May 5, 1908.

Application filed April 3, 1907. Serial No. 366,153.

*To all whom it may concern:*

Be it known that I, ALFRED FORTNER, citizen of the United States, residing at St. Elmo, county of Fayette, and State of Illinois, have invented certain new and useful Improvements in Vehicle-Springs, of which the following is a specification, reference being had therein to the accompanying drawing.

This invention relates to a vehicle spring, and particularly to one of elliptic shape.

The invention has for an object to provide the upper and lower sections of the spring at each end with a compound curved portion whereby these sections are spaced from each other and yet capable of contact in the compression of the spring or in absorbing the shock upon the sudden recoil thereof.

Other and further objects and advantages of the invention will be hereinafter fully set forth and the novel features thereof defined by the appended claims.

In the drawing:—Figure 1 is an elevation of the spring; Fig. 2 is an enlarged detail elevation of one half thereof, and Fig. 3 is a section on the line 3—3, Fig. 2.

Like numerals refer to like parts in the several views of the drawing.

The body of the spring comprises the lower section 1 formed of any suitable material and number of leaves as usual in this art. This section is bent backward upon itself at each end as shown at 2 and then again outward as at 3 to form a substantially goose neck shaped end. The upper section 4 of the spring is similarly curved backward upon itself as at 5 and thence outward as at 6, such curves having the configuration of the lower section but spaced therefrom to provide the compression spaces 7 and 8 which close upon the initial pressure applied and when so closed stiffening and strengthening the entire spring member. This disposition of the sections of the spring also provides shock absorbing spaces 9 and 10. The free ends of each section of the spring are connected together by surrounding each other as shown in Figs. 2 and 3 and held against lateral displacement by the headed bolt 11 having the fixed head 12 at one end and an opposite head 13 riveted thereon and extending over both of the spring sections.

In the operation of the invention when pressure is applied to the spring it closes first the space 8 between the sections thereof thus increasing the strength thereof and decreasing its flexibility, while a further pressure closes the space 7 by the movement of the upper section relative to the lower one and thus secures the maximum spring strength and rigidity. In the event of a sudden shock or recoil therefrom the space 9 first closes by contact of the leaves of the spring together and next the space 10 which is greater than the space 9 thus bringing into action the ends of the leaves of the spring. These leaves are made with tapering ends as shown at 9 and 10 to adapt them to the space occupied and provide an even flexibility to the spring, while the bolt connection at the ends of the spring prevents any lateral movement thereof. It will be observed that the spring may be formed of any desired number of leaves to adapt it to the use desired.

Having thus described my invention and set forth its merits, what I claim and desire to secure by Letters Patent is:—

1. An elliptic spring having its opposite members each bent backward to lie substantially parallel with the other at their ends with one member embracing a portion of the other, and means connecting said ends to permit independent movement of the embracing portions toward and from each other.

2. An elliptic spring having its opposite members at each end disposed substantially parallel and bent backward toward the body and thence outward to form a goose neck shape said members being spaced from each other, and means connecting the free ends of said members to permit independent movement of the parallel portions thereof toward and from each other.

3. An elliptic spring comprising a lower section bent at its ends into a compound curve, an independently movable upper section spaced from the lower section and bent to embrace the curved end portions thereof, and means connecting the ends of said sections to permit independent movement of the curved portions toward and from each other.

4. An elliptic spring comprising a lower section bent at its end into a compound curve, an independently movable upper section spaced from the lower section and bent at its end into a compound curve, to embrace the lower section and a headed bolt extending through and embracing the sides of the ends of said spring.

5. An elliptic spring composed of a plurality of leaves and having the end of the lower section disposed in a compound curve of successively decreasing diameter, an independently movable upper section disposed within and surrounding the end of the lower section and formed in a compound curve of successively decreasing diameter spaced from the curve of the lower section, and means for connecting the ends of said sections.

In testimony whereof I affix my signature in presence of two witnesses.

ALFRED FORTNER.

Witnesses:
  J. W. SHROYER,
  A. H. McCOLLOM.